(12) United States Patent
Gualtieri et al.

(10) Patent No.: US 8,384,377 B2
(45) Date of Patent: Feb. 26, 2013

(54) SELF-POWERED MAGNETIC TACHOMETER FOR SUPPLYING A SIGNAL REPRESENTATIVE OF ROTATIONAL RATE AND ABSOLUTE POSITION

(75) Inventors: Devlin M. Gualtieri, Ledgewood, NJ (US); Dwayne Benson, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 677 days.

(21) Appl. No.: 12/609,935

(22) Filed: Oct. 30, 2009

(65) Prior Publication Data

US 2011/0101969 A1    May 5, 2011

(51) Int. Cl.
*G01B 7/30* (2006.01)
*G01P 3/487* (2006.01)
(52) U.S. Cl. ............. 324/207.25; 324/174; 324/207.15
(58) Field of Classification Search .......... 324/207.2, 324/207.25, 174, 207.15
See application file for complete search history.

(56) References Cited

U.S. PATENT DOCUMENTS

| | | |
|---|---|---|
| 3,508,137 A | 4/1970 | Hill |
| 3,777,263 A | 12/1973 | Perron et al. |
| 3,934,200 A | 1/1976 | Schoonover et al. |
| 4,071,892 A | 1/1978 | Genzling |
| 4,088,943 A | 5/1978 | Schmidt |
| 4,811,255 A | 3/1989 | Kelly, III |
| 5,170,161 A | 12/1992 | Sakurai |
| 5,177,432 A | 1/1993 | Waterhouse et al. |
| 5,384,534 A * | 1/1995 | Bjork ............... 324/160 |
| 5,898,301 A * | 4/1999 | La Croix et al. ...... 324/207.22 |
| 6,084,400 A * | 7/2000 | Steinich et al. ...... 324/207.13 |
| 6,559,632 B1 | 5/2003 | Anderson et al. |
| 7,253,610 B2 | 8/2007 | Nagae |
| 7,304,471 B2 | 12/2007 | Koike et al. |
| 7,408,447 B2 | 8/2008 | Watson |
| 7,549,327 B2 | 6/2009 | Breed |
| 2006/0244581 A1 | 11/2006 | Breed et al. |
| 2008/0007256 A1* | 1/2008 | Waters et al. ......... 324/207.25 |

OTHER PUBLICATIONS

Electro-sensors. ST420, Shaft Tachometer Sensor/Transmitter, Users Manual.
Electro-sensors. ST420 Shaft Tachometer Sensor, Product Information Sheet.

* cited by examiner

*Primary Examiner* — Jay Patidar
(74) *Attorney, Agent, or Firm* — Ingrassia Fisher & Lorenz, P.C.

(57) ABSTRACT

A tachometer for supplying a signal representative of the rotational rate of a rotatable device includes a plurality of detection magnets, an index feature, and one or more non-rotationally mounted magnetic circuits. The detection magnets are coupled to, and spaced around, the device, to thereby rotate with the device when the device is rotated. The index feature is associated with the rotatable device, to thereby rotate with the device when the device is rotated. The index feature and the plurality of detection magnets are spaced evenly around the device. The magnetic circuits are spaced evenly around the device, and each magnetic circuit is configured to supply a first electrical signal each time one of the detection magnets rotates past the magnetic circuit and a second electrical signal each time the index feature rotates.

17 Claims, 4 Drawing Sheets

SELF-POWERED MAGNETIC TACHOMETER FOR SUPPLYING A SIGNAL REPRESENTATIVE OF ROTATIONAL RATE AND ABSOLUTE POSITION

TECHNICAL FIELD

The present invention generally relates to rotational speed detection, and more particularly relates to a wireless, self-powered, magnetically-based tachometer.

BACKGROUND

Various types and configurations of tachometers are presently known. One particular type of tachometer is implemented by mechanically coupling an electrical generator to the device whose rotation rate is being detected. With this configuration, the generator voltage is proportional to the device rotation rate. Other types of tachometers use an optical principle, in which an optical encoder disk or reflective marks on the device provide an optical indication of rotation that can be detected.

One advantage of the electrical generator configuration is that the generator may be used also as a power source. In this manner, a wireless tachometer may be made. However, the resultant device may be relatively large, since the combination of the generator and associated mechanical linkage to the device could occupy a relatively large volume. Furthermore, for large devices, such mechanical linkage can become relatively difficult to implement.

Hence, there is a need for a tachometer that can be implemented using a relatively simple coupling to a device, and/or in a relatively small volume. The present invention addresses at least these needs.

BRIEF SUMMARY

In one exemplary embodiment, a tachometer for supplying a signal representative of the rotational rate and absolute position of a rotatable device includes a plurality of detection magnets, an index feature, and one or more non-rotationally mounted magnetic circuits. The detection magnets are coupled to, and spaced around, the device, to thereby rotate with the device when the device is rotated. The index feature is associated with the rotatable device, to thereby rotate with the device when the device is rotated. The index feature and the plurality of detection magnets are spaced evenly around the device. The magnetic circuits are spaced evenly around the device, and each magnetic circuit is configured to supply a first electrical signal each time one of the detection magnets rotates past the magnetic circuit and a second electrical signal each time the index feature rotates past the magnetic circuit.

In another exemplary embodiment, a wireless tachometer for supplying a signal representative of rotational rate and absolute position of a rotatable device includes a plurality of detection magnets, an index feature, one or more non-rotationally mounted magnetic circuits, an energy harvester, a signal conditioner, and a transmitter. The detection magnets are coupled to, and spaced around, the device, to thereby rotate with the device when the device is rotated. The index feature is associated with the rotatable device, to thereby rotate with the device when the device is rotated, wherein the index feature and the plurality of detection magnets are spaced evenly around the device. The non-rotationally mounted magnetic circuits are spaced evenly around the device. Each magnetic circuit is configured to supply a first electrical signal each time one of the detection magnets rotates past the magnetic circuit and a second electrical signal each time the index feature rotates past the magnetic circuit. The energy harvester is coupled to receive the first and second electrical signals supplied by each of the magnetic circuits and is configured, upon receipt thereof, to supply regulated electrical power. The signal conditioner is coupled to receive the regulated electrical power and the first and second electrical signals supplied by each of the magnetic circuits and is configured, in response thereto, to supply a rate signal representative of device rotational rate, and determine and supply a position signal representative of absolute rotational position of the device. The transmitter is coupled to receive the regulated electrical power and the rate signal and is configured, in response thereto, to wirelessly transmit a radio frequency (RF) signal representative of rotatable device rotational rate.

In yet another exemplary embodiment, a tachometer for supplying a signal representative of rotational rate and absolute position of a rotatable device includes a plurality of detection magnets, one or more non-rotationally mounted magnetic circuits, and a signal conditioner. The detection magnets are coupled to, and spaced around, the device, to thereby rotate with the device when the device is rotated. The non-rotationally mounted magnetic circuits are spaced around the device. Each magnetic circuit is configured to supply one or more pulses each time one of the detection magnets rotates past the magnetic circuit. Each of the one or more pulses has a pulse height magnitude that varies with the rotational rate of the device. The signal conditioner is coupled to receive the one or more pulses supplied by each of the magnetic circuits and is configured to determine the rotational rate of the device based on the pulse height magnitude of the one or more pulses, and supply a rate signal representative of the determined rotational rate of the device.

Other desirable features and characteristics of the tachometer will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
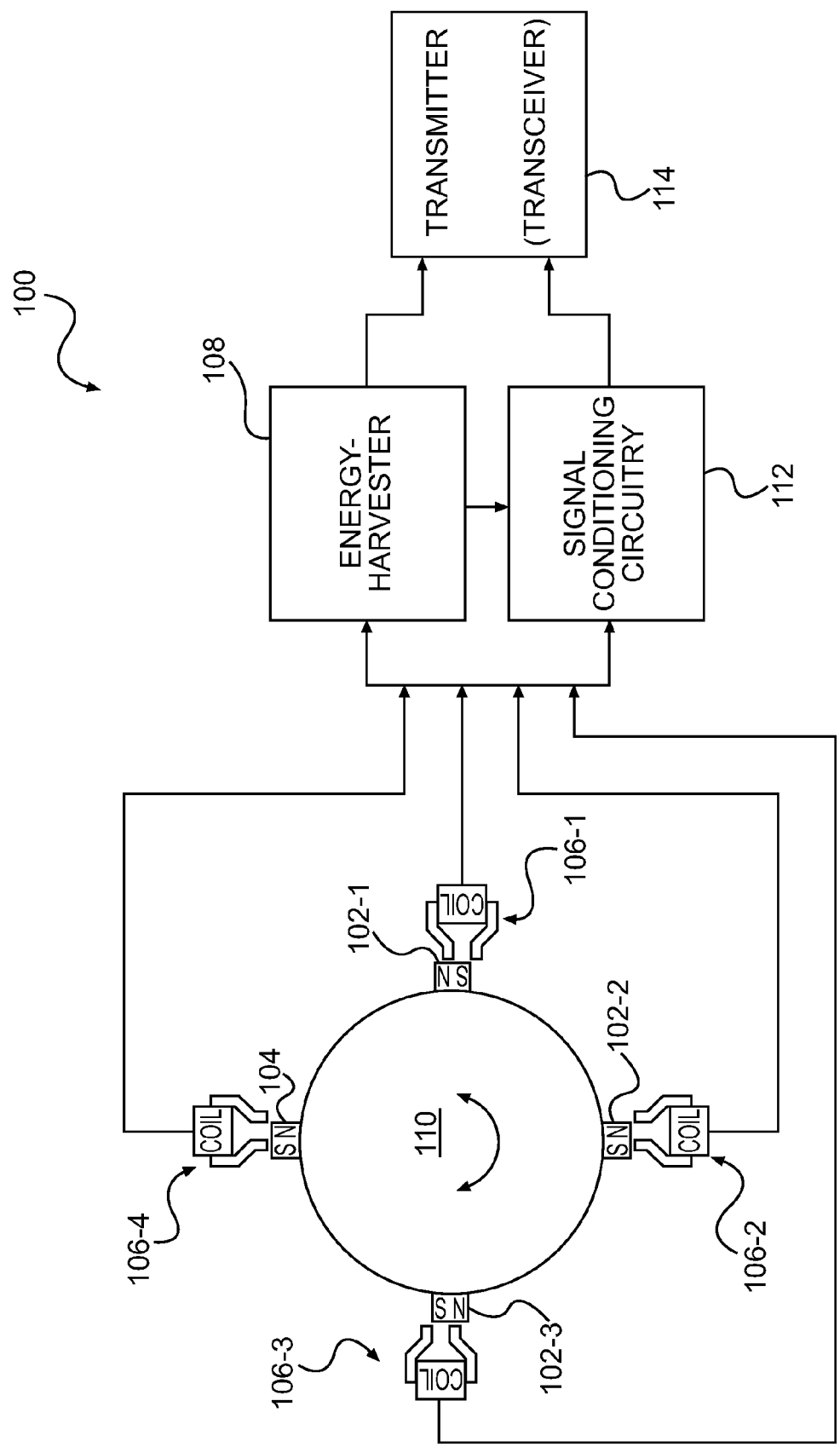
FIG. 1 depicts a functional block diagram of an exemplary wireless tachometer system.

Referring to FIG. 1, a functional block diagram of an exemplary self-powered, wireless magnetic tachometer 100 is depicted and includes a plurality of detection magnets 102 (e.g., 102-1, 102-2, 102-3, ... 102-N), an index feature 104, one or more magnetic circuits 106 (e.g., 106-1, 106-2, 106-3,

... 106-N), an energy harvester 108, a signal conditioner 112, and a transmitter 114. The detection magnets 102 are each coupled to, and spaced around, a rotatable device 110. Hence, the detection magnets 102 are rotated with the device 110 whenever it is rotated. The detection magnets 102 may be any one of numerous types of conventional dipole magnets, and are each disposed with the same magnetic polarity sense. In the depicted embodiment, the device 110 is a round shaft that may be rotated in either a clockwise or counterclockwise direction. It will be appreciated, however, that the device 110 may be any one of numerous suitable devices, of any one of numerous suitable shapes, which may be configured to rotate.

The index feature 104 is disposed on the device 110 and, as will be described further below, is used in detecting the absolute rotational position of the device 110. In one embodiment, the index feature 104 is implemented as a magnetic feature, and may be implemented using a magnet that is substantially identical to the detection magnets 102. With this embodiment the index feature 104 is disposed with its magnetic polarity opposite to those of the detection magnets 102. In other embodiments the index feature 104 may be implemented as a non-magnetic feature. The non-magnetic feature may be implemented as a separate component that is made from non-magnetic material and coupled to the device 110. In another embodiment the index feature may be part of the device 110 itself. In this latter embodiment, the index feature 104 may be thought of as the absence of one of the plurality of detection magnet 102. Although a single index feature 104 is depicted in FIG. 1, it will be appreciated that more than one index feature 104 could be included.

Figure 3:
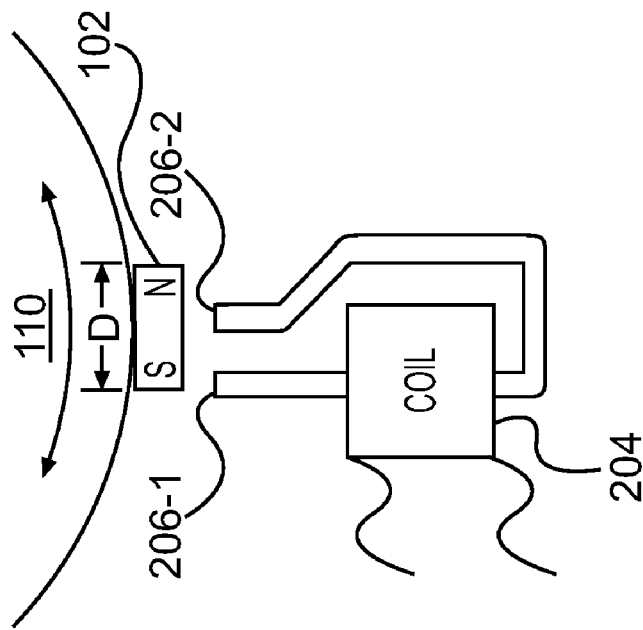
FIGS. 2 and 3 depict simplified schematic representations of alternative exemplary magnetic circuits that may be used in the system of FIG. 1.
Figure 2:
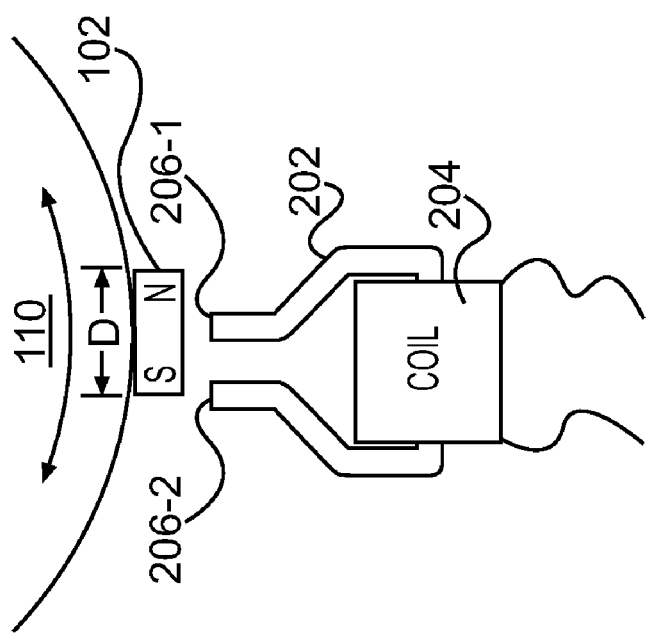
Figure 5:
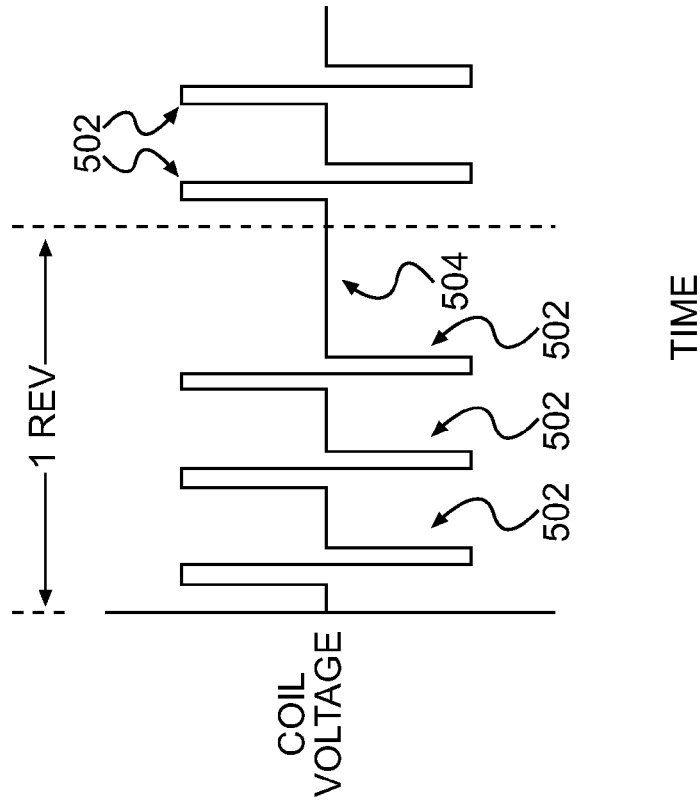
FIGS. 4 and 5 depict simplified examples of waveforms that may be supplied by the magnetic circuits of FIGS. 2 and 3.

The magnetic circuits 106 are spaced evenly around the device 110, and are non-rotationally mounted. Thus, when the device 110 rotates, the detection magnets 102 and index feature 104 will rotate past the magnetic circuits 106. Each magnetic circuit 106 is configured to supply a first signal each time one of the detection magnets 102 rotates past it, and a second signal each time the index feature rotates past it. As will be described further below, the manner in which the second signal is manifest will vary depending upon how the index feature 104 is implemented. It will be appreciated that although FIG. 1 depicts the same number of magnetic circuits 106 as the total of the detection magnets 102 and the index feature 104, this is merely exemplary and that different numbers of magnetic circuits 106 could be implemented. It will additionally be appreciated that the magnetic circuits 106 may be variously configured. However, in one embodiment, various configurations of which are depicted in FIGS. 2 and 3, each magnetic circuit 106 includes a magnetically permeable material 202 and a coil 204.

The magnetically permeable material 202 includes a first end 206-1 and a second end 206-2, and may be any one or more of numerous suitable materials that readily conduct magnetic flux. Some non-limiting examples of suitable materials include iron, silicon steel, Permalloy, and manganese-zinc ferrite. The coil 204 is wound around the magnetically permeable material 202, such that the magnetically permeable material 202 extends through the center of the coil 204, and is disposed between the first 206-1 and second 206-2 ends. The coil 204 is preferably formed of any one of numerous suitable electrical conductors such as copper, silver, and aluminum. For best response, the ends 206-1, 206-2 of the magnetically permeable material 202 are disposed in close proximity to the detection magnet 102 at its closed point of approach. In a particular preferred embodiment, the proximity is less than the magnetic gap. Moreover, the distance between the ends 206-1, 206-2 is preferably about half the magnet dimension (D) depicted in FIGS. 2 and 3.

According to Faraday's Law of Induction, the electromotive force ($\epsilon$) induced in a coil is proportional to the time derivative of the magnetic flux in the coil ($d\Phi/dt$). That is:

$$\epsilon = -d\Phi/dt.$$

With the above-described configuration, as a detection magnet 102 rotates past a magnetic circuit 106, the magnetically permeable material 202 conducts the magnetic flux of the detection magnet 102 through the center of the coil 204. The movement of the detection magnet 102 relative to the magnetic circuit 106 causes a change in the magnetic flux in the coil 204. This magnetic flux change generates a voltage (e.g., a first electrical signal) in the coil 204.

Figure 4:
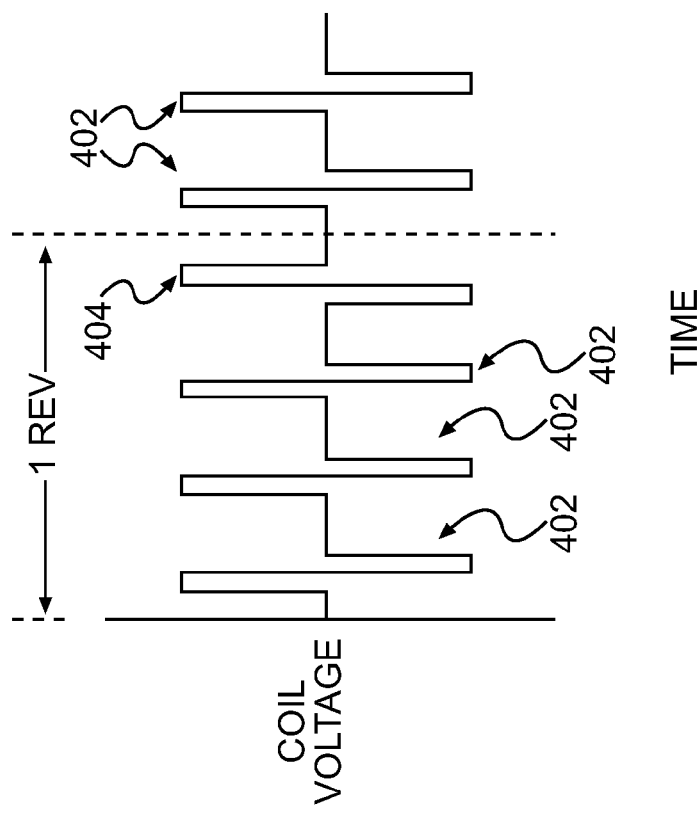

As was noted above, each magnetic circuit 106 is also configured to supply a second electrical signal each time the index feature 104 rotates past it. It will be appreciated that when the index feature 104 is implemented as a magnet, as described above, movement of the index feature 104 relative to a magnetic circuit 106 will cause a change in the magnetic flux in, and generation of a voltage (e.g., a second electrical signal) in, its coil 204. Because the magnetic polarities of the index feature are disposed opposite to the magnetic polarities of the detection magnets 102, the first and second electrical signals supplied by each magnetic circuit 106 will be opposite in polarity. A simplified example of a waveform, comprising first electrical signals 402 and second electrical signals 404, that may be supplied by a magnetic circuit 106 when the tachometer 100 includes three detection magnets 102 and one magnetic index feature 104 is depicted in FIG. 4. As may be seen, the first electrical signals 402 are all of opposite polarity to that of the second electrical signals 404.

Alternatively, when the index feature 104 is implemented as a non-magnetic material, as described above, then its movement past a magnetic circuit 106 will cause no (or at least very little) voltage to be generated in its coil 204. Thus, the second electrical signal will have an amplitude significantly less than that of the first electrical signal. A simplified example of a waveform, comprising first electrical signals and second electrical signals, that may be supplied by a magnetic circuit 106 when the tachometer 100 includes three detection magnets 102 and one non-magnetic index feature 104 is depicted in FIG. 4. As may be seen, the first electrical signals 502 each have an amplitude magnitude that is significantly greater than that of the second electrical signals 504.

No matter how the index features 104 are specifically implemented, the magnetic circuits 106 each supply the first and second electrical signals to both the energy harvester 108 and the signal conditioning circuit 112. The energy harvester 108 is configured, upon receipt of the first and second electrical signals, to supply regulated electrical power. The energy harvester 108 may be variously configured and implemented using any one of numerous known circuits and circuit elements, now known or developed in the future. In one particular exemplary embodiment, the energy harvester 108 may include suitable a rectifier, filter, and regulator circuits. In any case, the regulated electrical power is supplied to, and energizes, the signal conditioner 112 and the transmitter 114.

The signal conditioner 112, in addition to being powered by the energy harvester 108, receives the first and second signals from each of the magnetic circuits 106. The signal conditioner 112, using any one of numerous known hardware, software, and/or firmware configurations, supplies a rate signal representative of the rotational rate of the device 110. The signal conditioner 112 additionally determines and supplies a position signal representative of the absolute rotational position of the device 110. Both of these signals are then supplied to the transmitter 114.

Figure 6:
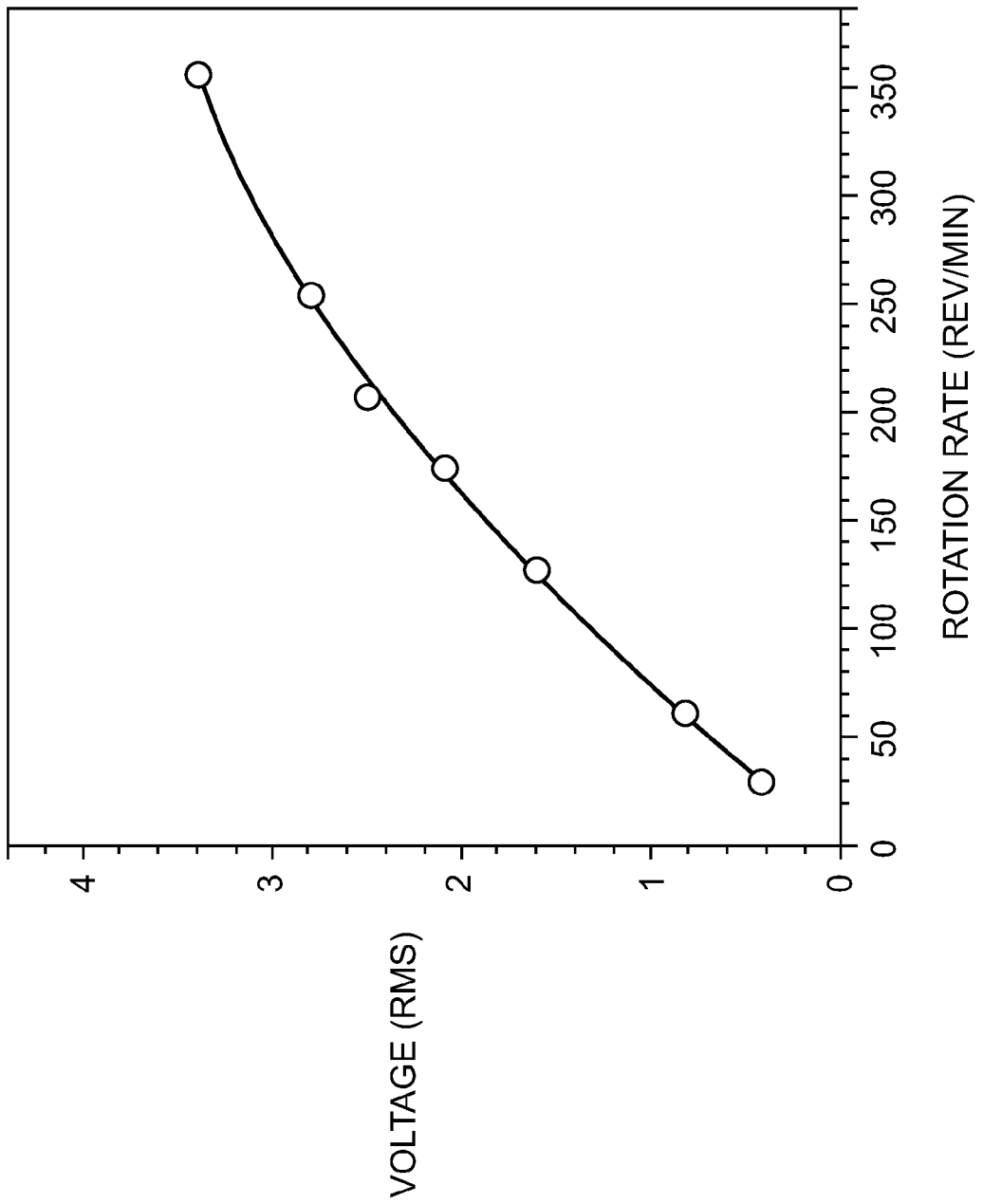
FIG. 6 depicts a graph of voltage output by an exemplary magnetic circuit versus rotational speed of a rotating device.

The electromotive force (ε) induced in a coil 204, as previously noted, is proportional to the time derivative of the magnetic flux in the coil (dφ/dt). Thus, the greater the time rate of change of the magnetic flux, the greater the electromotive force (i.e., voltage amplitude) induced in a coil 204. For example, when a shaft with four detection magnets 102 disposed thereon was rotated at speeds between 30 and about 360 revolutions per minute (RPM), the voltage generated by a signal magnetic circuit 106 increased from about $0.412\,V_{rms}$ to about $3.4_{rms}$. A graph depicting this result is illustrated in FIG. 6. It may thus be appreciated that the rotational rate of the device 110 may be determined from, for example, the rate at which pulses are generated and supplied from the magnetic circuits 106, or from the amplitude (e.g., pulse height) of pulses supplied from the magnetic circuits 106.

The transmitter 114 is coupled to receive the regulated electrical power from the energy harvester 108, and also receives the rate signal and the position signal from the signal conditioner 112. The transmitter 114 is configured to wirelessly transmit a signal representative of the rotational rate and the absolute rotational position of the device 110. The transmitted signal may be a radio frequency signal, an optical signal, or any one of numerous other types of electromagnetic waves. It will be appreciated that the transmitter 114 may be implemented using any one of numerous known hardware, software, and/or firmware configurations. It will additionally be appreciated that the transmitter 114 could additionally implement a receiver, and as such be configured as a transceiver.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A tachometer for supplying a signal representative of rotational rate and absolute position of a rotatable device, comprising:
    a plurality of detection magnets coupled to, and spaced around, the device, to thereby rotate with the device when the device is rotated;
    an index feature associated with the rotatable device, to thereby rotate with the device when the device is rotated, wherein the index feature and the plurality of detection magnets are spaced evenly around the device;
    a plurality of non-rotationally mounted magnetic circuits spaced evenly around the device, each magnetic circuit configured to supply a first electrical signal each time one of the detection magnets rotates past the magnetic circuit and a second electrical signal each time the index feature rotates past the magnetic circuit;
    an energy harvester coupled to receive the first and second signals supplied by each of the magnetic circuits and configured, upon receipt thereof, to supply regulated electrical power; and
    a signal conditioner coupled receive to the regulated electrical power and the first and second signals supplied by each of the magnetic circuits and configured, in response thereto, to supply a rate signal representatives of device rotational rate.

2. The tachometer of claim 1, wherein:
    the plurality of detection magnets are each coupled to the device and disposed with a first magnetic polarity sense; and
    the index feature comprises a magnet that is coupled the device and disposed with a second polarity sense, the second polarity sense being opposite to the first polarity sense.

3. The tachometer of claim 2, wherein the first signal and the second signal are opposite in polarity.

4. The tachometer of claim 1, wherein the index feature comprises a non-magnetic feature.

5. The tachometer of claim 4, wherein the non-magnetic feature comprises a portion of the device.

6. The tachometer of claim 4, wherein the second signal has an amplitude substantially less than that of the first signal.

7. The tachometer of claim 1, wherein each magnetic circuit comprises:
    a magnetically permeable material having a first end and a second end; and
    a coil wound around the magnetically permeable material and disposed between the first end and the second end.

8. The tachometer of claim 1, further comprising:
    a transmitter coupled to receive the rate signal and configured, in response thereto, to wirelessly transmit a signal representative of rotatable device rotational rate.

9. The tachometer of claim 8, wherein the signal condition is further configured, in response to at least the second signals, to determine and supply a position signal representative of absolute rotational position of the device.

10. The tachometer of claim 8, wherein:
    the first signal supplied from each magnetic circuit comprises one or more pulses, each of the one or more pulses having a pulse height magnitude that varies with the rotational rate of the device; and
    the signal conditioner is configured to (i) determine the rotational rate of the device based on the pulse height magnitude of the one or more pulses and (ii) supply the rate signal.

11. A wireless tachometer for supplying a signal representative of rotational rate and absolute position of a rotatable device, comprising:
    a plurality of detection magnets coupled to, and spaced around, the device, to thereby rotate with the device when the device is rotated;
    an index feature associated with the rotatable device, to thereby rotate with the device when the device is rotated, wherein the index feature and the plurality of detection magnets are spaced evenly around the device;
    a plurality of non-rotationally mounted magnetic circuits spaced evenly around the device, each magnetic circuit configured to supply a electrical first signal each time one of the detection magnets rotates past the magnetic circuit and a second electrical signal each time the index feature rotates past the magnetic circuit;
    an energy harvester coupled to receive the first and second electrical signals supplied by each of the magnetic circuits and configured, upon receipt thereof, to supply regulated electrical power;
    a signal conditioner coupled to receive the regulated electrical power and the first and second electrical signals supplied by each of the magnetic circuits and configured, in response thereto, to (i) supply a rate signal representative of device rotational rate and (ii) determine and supply a position signal representative of absolute rotational position of the device; and a transmitter coupled to receive the regulated electrical power, the rate signal, and the position signal and configured, in response thereto, to wirelessly transmit a signal representative of rotatable device rotational rate and absolute rotational position.

12. The wireless tachometer of claim 11, wherein:
the plurality of detection magnets are each coupled to the device and disposed with a first magnetic polarity sense; and
the index feature comprises a magnet that is coupled the device and disposed with a second polarity sense, the second polarity sense being opposite to the first polarity sense.

13. The wireless tachometer of claim 12, wherein the first electrical signal and the second electrical signal are opposite in polarity.

14. The wireless tachometer of claim 11, wherein the index feature comprises a non-magnetic feature.

15. The wireless tachometer of claim 14, wherein the second electrical signal has an amplitude substantially less than that of the first electrical signal.

16. The wireless tachometer of claim 11, wherein each magnetic circuit comprises:
a magnetically permeable material having a first end and a second end; and
a coil wound around the magnetically permeable material and disposed between the first end and the second end.

17. The wireless tachometer of claim 11, wherein:
the first electrical signal supplied from each magnetic circuit comprises one or more pulses, each of the one or more pulses having a pulse height magnitude that varies with the rotational rate of the device; and
the signal conditioner is configured to (i) determine the rotational rate of the device based on the pulse height magnitude of the one or more pulses and (ii) supply the rate signal.

* * * * *